(12) United States Patent
Roundy et al.

(10) Patent No.: US 9,665,715 B1
(45) Date of Patent: May 30, 2017

(54) SYSTEMS AND METHODS FOR DETECTING MALWARE-INDUCED CRASHES

(71) Applicant: Symantec Corporation, Mountain View, CA (US)

(72) Inventors: Kevin Roundy, El Segundo, CA (US); Sandeep Bhatkar, Sunnyvale, CA (US); Fanglu Guo, Los Angeles, CA (US); Daniel Marino, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 80 days.

(21) Appl. No.: 14/138,130

(22) Filed: Dec. 23, 2013

(51) Int. Cl.
*G06F 21/62* (2013.01)
*G06F 21/56* (2013.01)

(52) U.S. Cl.
CPC ................... *G06F 21/562* (2013.01)

(58) Field of Classification Search
CPC ............. H04L 63/1416; H04L 63/1408; H04L 63/1441; H04L 63/1458; G06F 21/552; G06F 21/562
USPC .......................................................... 726/23
See application file for complete search history.

(56) References Cited

U.S. PATENT DOCUMENTS

| | | | |
|---|---|---|---|
| 5,086,385 A * | 2/1992 | Launey et al. | 700/83 |
| 7,966,278 B1 | 6/2011 | Satish | |
| 8,006,116 B1 * | 8/2011 | Sobel et al. | 714/1 |
| 8,255,902 B1 | 8/2012 | Satish | |
| 8,281,403 B1 * | 10/2012 | Asheghian | G06F 11/008 705/400 |
| 9,166,997 B1 * | 10/2015 | Guo | H04L 63/1433 |
| 2004/0210796 A1 * | 10/2004 | Largman | G06F 11/1417 714/20 |
| 2009/0228871 A1 * | 9/2009 | Edwards et al. | 717/128 |
| 2015/0135262 A1 * | 5/2015 | Porat et al. | H04L 63/145 |

OTHER PUBLICATIONS

Sourabh Satish, et al; Social Trust Based Security Model; U.S. Appl. No. 11/394,846, filed Mar. 31, 2006.

(Continued)

*Primary Examiner* — Amir Mehrmanesh
*Assistant Examiner* — Sakinah W. Taylor
(74) *Attorney, Agent, or Firm* — FisherBroyles LLP

(57) ABSTRACT

A computer-implemented method for detecting malware-induced crashes may include (1) identifying, by analyzing a health log associated with a previously stable computing device, the occurrence of an unexpected stability problem on the previously stable computing device, (2) identifying, by analyzing an event log associated with the previously stable computing device, an event that is potentially responsible for the occurrence of the unexpected stability problem on the previously stable computing device, (3) determining, due at least in part to the event being potentially responsible for the occurrence of the unexpected stability problem on the previously stable computing device, that the event is potentially malicious, and (4) performing a security action in response to determining that the event is potentially malicious. Various other methods, systems, and computer-readable media are also disclosed.

20 Claims, 6 Drawing Sheets

(56) References Cited

OTHER PUBLICATIONS

Wyman, Alice et al., "Troubleshoot Firefox issues caused by malware", http://support.mozilla.org/en-US/kb/troubleshoot-firefox-issues-caused-malware, as accessed Nov. 13, 2013, (May 28, 2012).
Ghosh, Anup K., et al., "Learning Program Behavior Profiles for Intrusion Detection", http://citeseerx.ist.psu.edu/viewdoc/download?doi=10.1.1.38.9150&rep=rep1&type=pdf, as accessed Nov. 13, 2013, The USENIX Association, Santa Clara, CA, (Apr. 9-12, 1999).
Han, Sang-Jun et al., "Evolutionary neural networks for anomaly detection based on the behavior of a program", http://ieeexplore.ieee.org/stamp/stamp.jsp?arnumber=1634649, as accessed Nov. 13, 2015, IEEE Transactions on Systems, Man, and Cybernetics, Part B: Cybernetics, (vol. 36, Issue: 3), (Jun. 2005), pp. 559-570.
"McAfee", http://www.mcafee.com/us/, as accessed Nov. 13, 2013, (Feb. 29, 2000).
"Kaspersky Lab", http://usa.kaspersky.com/?domain=kaspersky.com, as accessed Nov. 13, 2013, (Aug. 24, 2012).

* cited by examiner

SYSTEMS AND METHODS FOR DETECTING MALWARE-INDUCED CRASHES

BACKGROUND

Individuals and businesses face a growing tide of viruses, worms, and other malicious programs (collectively known as "malware") that threaten the stability and performance of their computers and the security of their data. Unfortunately, due to the increasing sophistication of malware, the amount of effort and energy required to detect and neutralize malware has grown increasingly complex.

Malicious programmers, however, often lack the time, ability, and/or expertise to adequately test the impact of their code on the wide range of hardware and software configurations that exist in the wild. As a result, malware often causes or suffers from a variety of conflicts, incompatibilities, crashes, and other stability problems. This is especially true for non-process threats that attempt to manipulate, modify, or otherwise utilize the functionality of an otherwise legitimate process to accomplish a malicious purpose.

The instant disclosure, therefore, identifies a need for systems and methods that are capable of identifying malware-induced crashes and, therefore, the malware itself.

SUMMARY

As will be described in greater detail below, the instant disclosure describes various systems and methods for detecting malware-induced crashes by identifying and scrutinizing events that are responsible for unexpected stability problems on previously stable computing devices. In one example, a computer-implemented method for performing such a task may include (1) identifying, by analyzing a health log associated with a previously stable computing device, the occurrence of an unexpected stability problem on the previously stable computing device, (2) identifying, by analyzing an event log associated with the previously stable computing device, an event that is potentially responsible for the occurrence of the unexpected stability problem on the previously stable computing device, (3) determining, due at least in part to the event being potentially responsible for the occurrence of the unexpected stability problem on the previously stable computing device, that the event is potentially malicious, and (4) performing a security action in response to determining that the event is potentially malicious.

The health log may track a variety of information, including the overall stability of the previously stable computing device over time, the stability (over time) of application software installed on the previously stable computing device, and/or the stability (over time) of system software installed on the previously stable computing device. As such, identifying the occurrence of the unexpected stability problem on the previously stable computing device may include identifying, by analyzing the health log, a substantial decrease in the overall stability of the previously stable computing device, a substantial decrease in the stability of application software installed on the previously stable computing device, and/or a substantial decrease in the stability of system software installed on the previously stable computing device.

In some embodiments, the method may also include, prior to analyzing the health log, creating and/or retrieving the health log. In addition, identifying the event that is potentially responsible for the occurrence of the unexpected stability problem on the previously stable computing device may include determining, by analyzing the event and health logs, that the event occurred substantially contemporaneously with respect to the start of the unexpected stability problem and/or that the event involved or targeted a software component installed on the previously stable computing device that experienced the unexpected stability problem.

In one example, the determination that the event is potentially malicious may be additionally based at least in part on a determination that the event is potentially indicative of infection by a non-process threat. In this example, the determination that the event is potentially indicative of infection by a non-process threat may include determining that the event involved code injection, creating or modifying a shared library, creating or modifying registry entries, installing or modifying a kernel component, etc.

Additionally or alternatively, the determination that the event is potentially malicious may be additionally based at least in part on a determination that computing devices within a community associated with the previously stable computing device have also experienced the unexpected stability problem and/or a determination that computing devices outside of a community associated with the previously stable computing device have not experienced the unexpected stability problem.

In some examples, performing the security action may include blacklisting the event and/or transmitting a notification to at least one additional computing device that indicates that the event is potentially malicious. In addition, the above-described method may be performed by a variety of devices, including the previously stable computing device and/or a server-side computing device.

In one embodiment, a system for implementing the above-described method may include an identification module, stored in memory, that (1) identifies, by analyzing a health log associated with a previously stable computing device, the occurrence of an unexpected stability problem on the previously stable computing device and (2) identifies, by analyzing an event log associated with the previously stable computing device, an event that is potentially responsible for the occurrence of the unexpected stability problem on the previously stable computing device. The system may also include a determination module, stored in memory, that determines that the event is potentially malicious due at least in part to the event being potentially responsible for the occurrence of the unexpected stability problem on the previously stable computing device. In addition, the system may include a security module, stored in memory, that performs a security action in response to determining that the event is potentially malicious. The system may also include at least one processor configured to execute the identification module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, by analyzing a health log associated with a previously stable computing device, the occurrence of an unexpected stability problem on the previously stable computing device, (2) identify, by analyzing an event log associated with the previously stable computing device, an event that is potentially responsible for the occurrence of the unexpected stability problem on the previously stable computing device, (3) determine, due at least in part to the event being potentially responsible for the occurrence of the unexpected stability problem on the previously stable computing device, that the event is potentially malicious, and (4) perform a security action in response to determining that the event is potentially malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
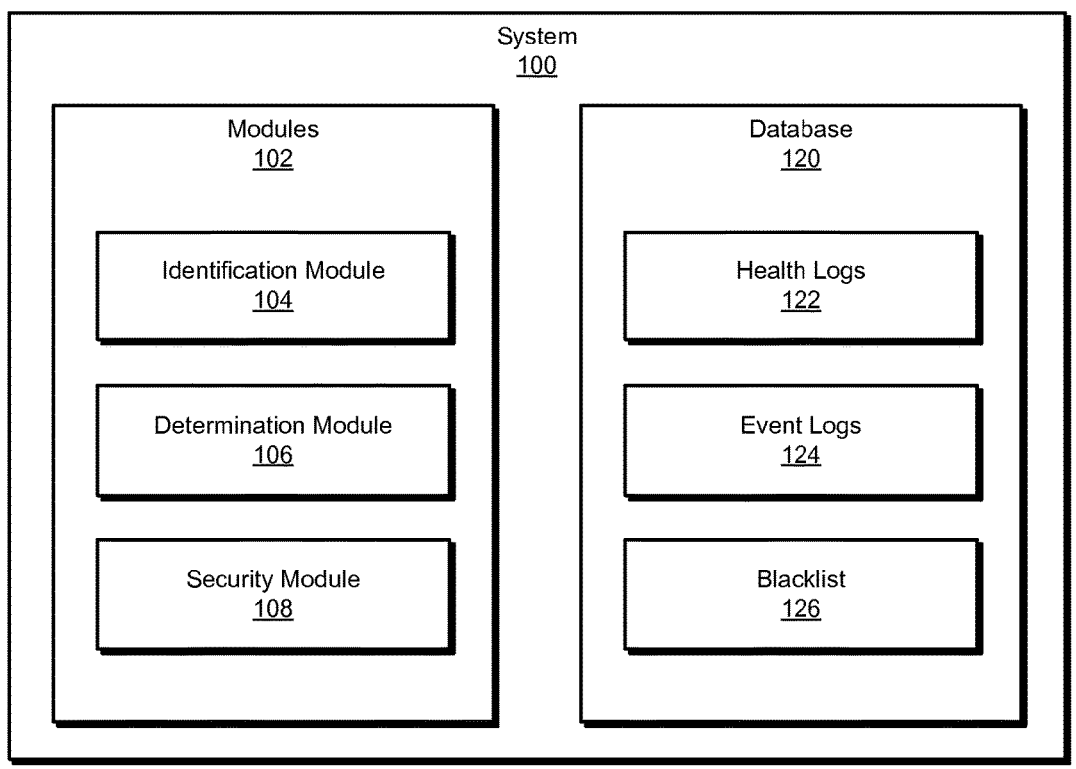
FIG. 1 is a block diagram of an exemplary system for detecting malware-induced crashes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malware-induced crashes. As will be explained in greater detail below, by identifying and scrutinizing events that are responsible for unexpected stability problems on previously stable computing devices, the systems and methods described herein may be able to identify potential security issues (such as non-process threats and/or advanced persistent threats) that may otherwise remain undetected. In addition, by verifying whether other computing devices (such as computing devices within a particular enterprise, industry, or the world at large) have also experienced the stability problems and/or events in question, the disclosed systems and methods may be able to reduce false positives, potentially resulting in a more accurate and effective security solution.

Figure 2:
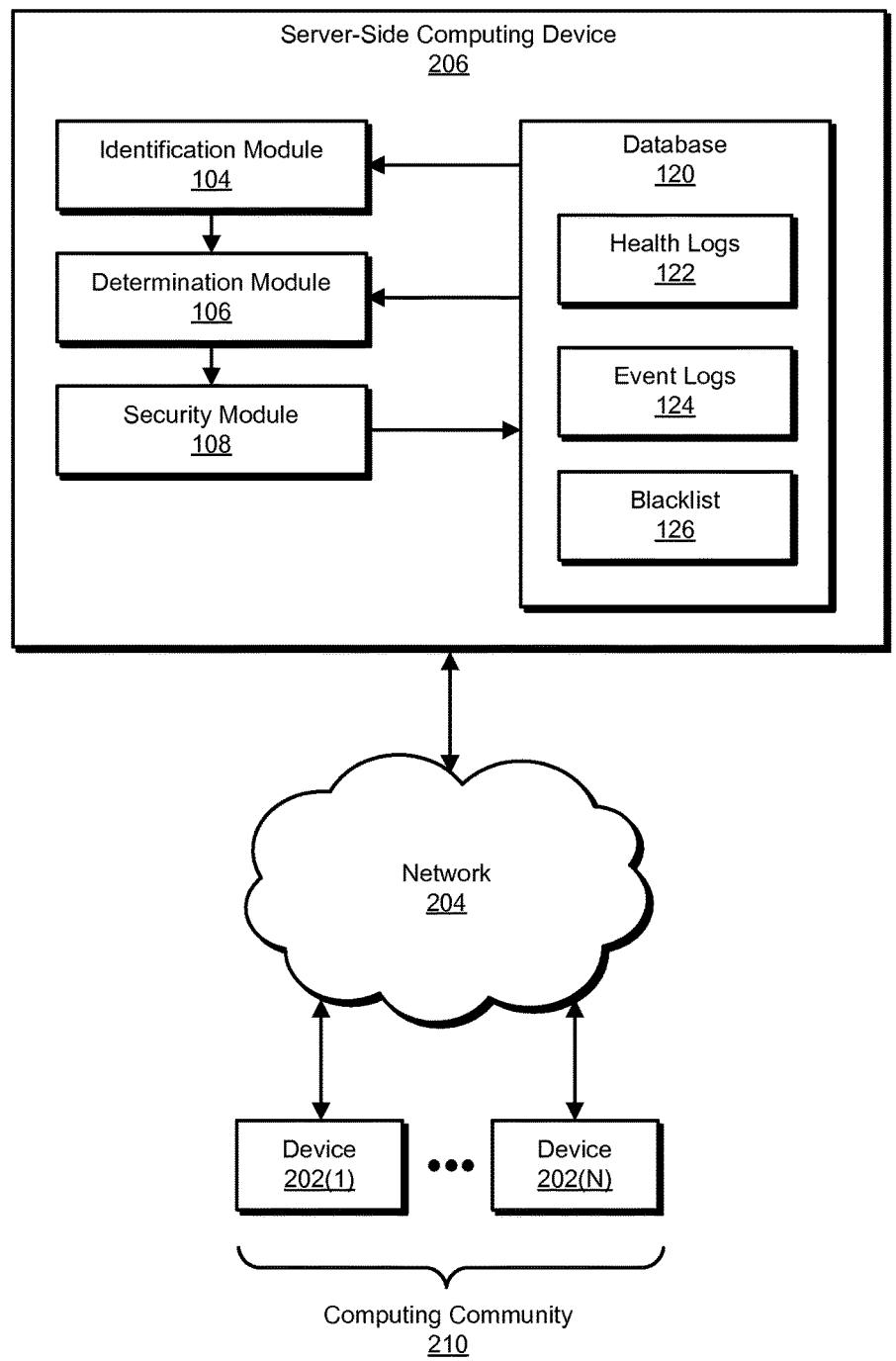
FIG. 2 is a block diagram of an additional exemplary system for detecting malware-induced crashes.

The following will provide, with reference to FIGS. 1-2, detailed descriptions of exemplary systems for detecting malware-induced crashes. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting malware-induced crashes. As illustrated in this figure, exemplary system 100 may include one or more modules 102 for performing one or more tasks. For example, and as will be explained in greater detail below, exemplary system 100 may include an identification module 104 that may identify, by analyzing both a health log and an event log associated with a previously stable computing device, (1) the occurrence of an unexpected stability problem on the previously stable computing device and (2) an event that is potentially responsible for the occurrence of the unexpected stability problem on the previously stable computing device.

Exemplary system 100 may also include a determination module 106 that may determine that the event is potentially malicious due at least in part to the event being potentially responsible for the occurrence of the unexpected stability problem on the previously stable computing device. In addition, system 100 may include a security module 108 that may perform a security action in response to determining that the event is potentially malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., devices 202(1)-(N) and/or server-side computing device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more health logs 122, each of which may, as detailed below, track the stability (over time) of system and/or application software installed on a computing device. Database 120 may also be configured to store one or more event logs 124, each of which may record both events that have occurred in connection with a computing device and the time that these events occurred. In some examples, database 120 may also be configured to store a blacklist 126 that identifies potentially malicious objects and/or events.

Database 120 may represent portions of a single database or computing device or a plurality of databases or computing devices. For example, database 120 may represent a portion of server-side computing device 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as devices 202(1)-(N) and/or server-side computing device 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a plurality of devices 202(1)-(N) in communication with a server-side computing device 206 via a network 204. In one example, server-side computing device 206 may be programmed with one or more of modules 102 and/or may store all or a portion of the data in database 120. Additionally or alternatively, devices 202(1)-(N) may be programmed with one or more of modules 102 and/or may store all or a portion of the data in database 120.

In one embodiment, one or more of modules 102 from FIG. 1 may, when executed by at least one processor of devices 202(1)-(N) and/or server-side computing device 206, enable devices 202(1)-(N) and/or server-side computing device 206 to detect malware-induced crashes. For example, and as will be described in greater detail below, identification module 104 may, as part of server-side computing device 206, identify, by analyzing health logs 122, the occurrence of an unexpected stability problem on device 202(1). Identification module 104 may then identify, by analyzing event logs 124, an event that is potentially responsible for the occurrence of the unexpected stability problem on device 202(1). Determination module 106 may then determine, due at least in part to the event being potentially responsible for the occurrence of the unexpected stability problem on device 202(1), that the event is potentially malicious. Security module 108 may then perform a security action in response to determining that the event is potentially malicious.

Devices 202(1)-(N) generally represent any type or form of computing device capable of reading computer-executable instructions. Examples of devices 202(1)-(N) include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server-side computing device 206 generally represents any type or form of computing device that is capable of gathering and/or analyzing data (such as health or event logs) from additional computing devices. Examples of server-side computing device 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between devices 202(1)-(N) and server-side computing device 206.

Figure 3:
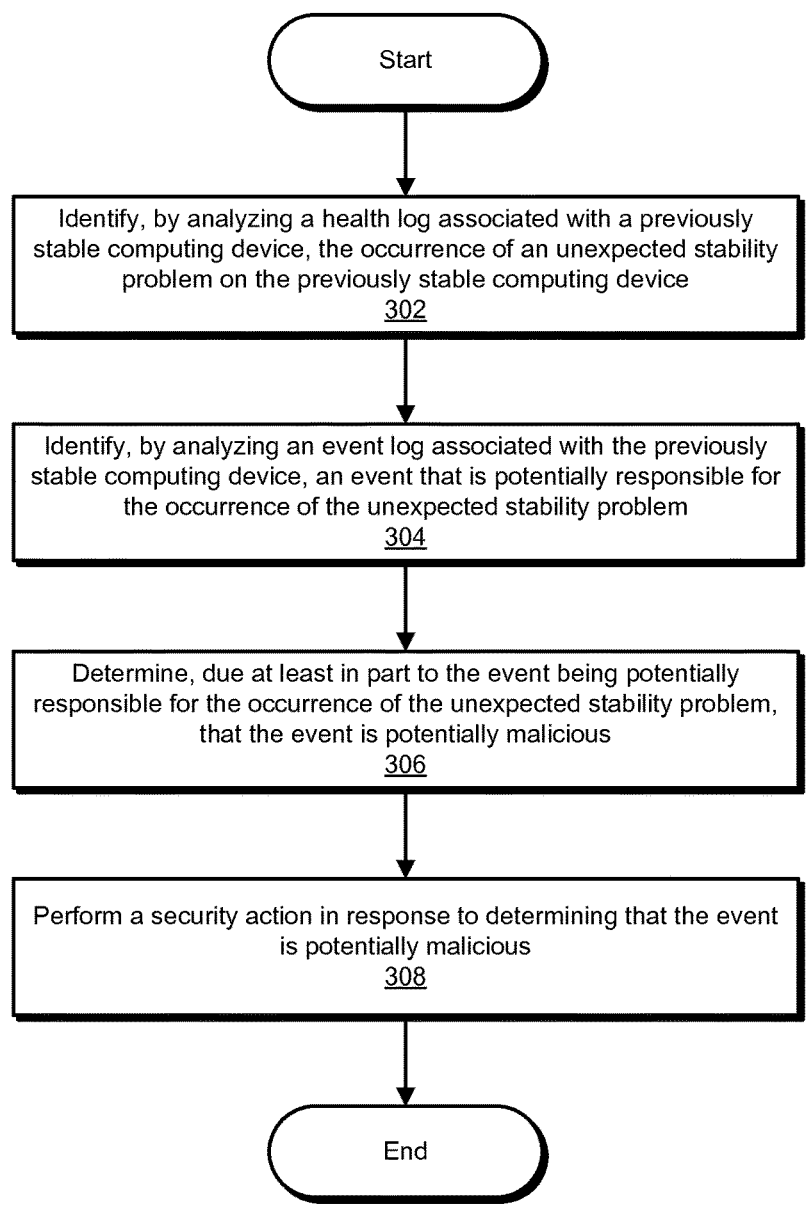
FIG. 3 is a flow diagram of an exemplary method for detecting malware-induced crashes.

FIG. 3 is a flow diagram of an exemplary computer-implemented method 300 for detecting malware-induced crashes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6. For example, the steps shown in FIG. 3 may be performed by a client-side computing device (such as devices 202(1)-(N)) and/or a server-side computing device (such as server-side computing device 206).

As illustrated in FIG. 3, at step 302 one or more of the systems described herein may identify, by analyzing a health log associated with a previously stable computing device, the occurrence of an unexpected stability problem on the previously stable computing device. For example, identification module 104 may, as part of server-side computing device 206 in FIG. 2, identify the occurrence of an unexpected stability problem on device 202(1) by analyzing health logs 122.

The term "stability problem," as used herein, generally refers to any degradation or reduction in the overall health (i.e., the stability, performance, or state of security) of either of a computing device as a whole or individual software components (such as system and/or application software) installed on the same. Examples of stability problems include, without limitation, operating-system errors (such as blue-screen errors or system reboots), application errors (such as application crashes, hangs, or freezes), service errors, device-driver errors, page faults, excessive CPU usage, excessive network usage, excessive memory usage, etc.

Similarly, the phrase "previously stable" device or software component, as used herein, generally refers to a device or software component that has deviated from an expected stability norm. As will be appreciated, stability norms (and, thus, deviations from the same) may be expressed, quantified, and/or represented in any of a variety of ways, including using scores, percentages, running averages, maximum or peak values, incremental count values, etc.

In addition, the term "health log," as used herein, generally refers to any type or form of data structure capable of tracking or recording, over time, the health of either a computing device as a whole or individual software components (such as system and/or application software) installed on the same. In some examples, each health log stored in database 120 may be created by security software installed on an endpoint device, such as devices 202(1)-(N) in FIG. 2. For example, security software installed on device 202(1) may create and/or update a health log for device 202(1) by continually evaluating and tracking (e.g., on a scheduled basis and/or in response to various trigger events) the health of device 202(1) using various health metrics. Upon creating and/or updating this health log, the security software may then transmit the same to server-side computing device 206, which may store the same in database 120 for later retrieval and analysis.

Examples of the types of metrics that may be used to evaluate or measure the health of a device when creating a health log include, without limitation, the device's current (or average) system uptime, the number of operating-system errors (such as blue-screen errors or system reboots), application errors (such as application crashes, hangs, or freezes), service errors, and/or device-driver errors experienced by the device or its software, the CPU usage of the device or its software, the number of page faults experienced by the device or its software, the network usage of the device or its software, and/or the memory usage of the device or its software. As will be appreciated, the results of these evaluations may be expressed, quantified, and/or represented in any of a variety of ways, including using running averages, maximum or peak values, incremental count values, percentages, scores, or any other suitable method.

The systems described herein may perform step 302 in a variety of ways. In one example, identification module 104 may identify the occurrence of an unexpected stability problem on a previously stable computing device (e.g., device 202(1)) by determining that the overall stability of the device, and/or an individual software component installed on the device, has substantially decreased. For example, identification module 104 may determine that the overall stability of device 202(1) (and/or an individual software component installed on the same) has dropped below or otherwise deviated from a predetermined stability threshold or standard, as defined by the various metrics described above.

Figure 4:
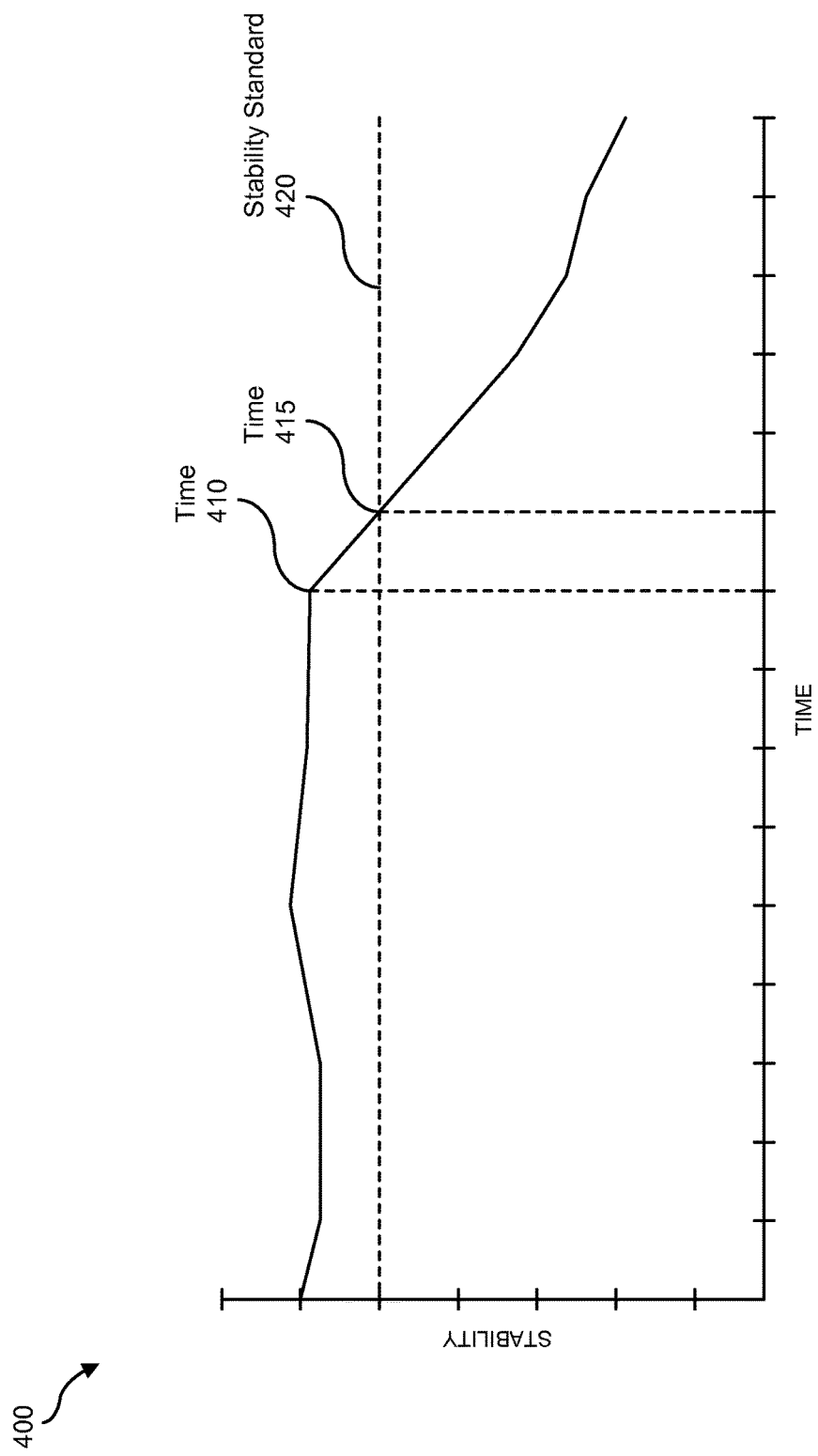
FIG. 4 is an illustration of the results of an exemplary health log that tracks the stability of a computing device over time.

FIG. 4 is a graphical representation 400 of the results of an exemplary health log used to track, over time, the stability of a computing device (and/or an individual software component installed on the same). As illustrated in this figure, graphical representation 400 demonstrates that the device or individual software component in question exceeded stability standard 420 until time 415, at which point the stability of the device or software component dropped below stability standard 420. In this example, identification module 104 may determine that the computing device and/or software component in question experienced a stability problem at time 415 due to falling below stability standard 420.

Returning to FIG. 3, at step 304 the systems described herein may identify, by analyzing an event log associated with the previously stable computing device, an event that is potentially responsible for the occurrence of the unexpected stability problem on the previously stable computing device. For example, identification module 104 may, as part of server-side computing device 206 in FIG. 2, identify, by analyzing event logs 124, an event that is potentially responsible for the occurrence of the unexpected stability problem identified in step 302.

The term "event," as used herein, generally refers to any type or form of detectable computing action or occurrence. Similarly, the term "event log," as used herein, generally refers to any type or form of data structure capable of tracking or recording events that occur in connection with either a computing device as a whole or individual software components (such as system and/or application software) installed on the same. Examples of the types of events that may be tracked or recorded in an event log include, without limitation, events that involve downloading or executing a file, creating or modifying a shared library (such as a DLL file), creating or modifying a registry entry (such as a registry entry associated with a system service), installing or modifying a kernel component (such as a kernel driver), injecting code into a process, and/or any other type or form of event that may impact the health (i.e., the stability, performance, and/or state of security) of a computing device or its software.

In some examples, event logs 124 may also track or record one or more characteristics of each recorded event. Examples of such characteristics include, without limitation, the time that an event occurred or ended (using, e.g., timestamps), the process, file, registry entry, or storage or memory location associated with or targeted by an event, information that identifies the origin of an event (e.g., the process or file name of an object that initiated the event), and/or any other type or form of information that may be useful in identifying causation between an event and a later observed effect (e.g., a stability problem) on a computing device or its software.

In some examples, each event log stored in database 120 may be created by security software installed on an endpoint device, such as devices 202(1)-(N) in FIG. 2. For example, security software installed on device 202(1) may create and/or update an event log for device 202(1) by continually evaluating and tracking (e.g., on a scheduled basis and/or in response to various trigger events) events that occur on device 202(1). Upon creating and/or updating this event log, the security software may then transmit the same to server-side computing device 206, which may store the same in database 120 for later retrieval and analysis.

The systems described herein may perform step 304 in a variety of ways. In one example, identification module 104 may identify an event that is potentially responsible for the occurrence of the unexpected stability problem identified in step 302 by identifying, by analyzing and comparing health logs 122 and event logs 124, an event that occurred substantially contemporaneously with respect to the start of the unexpected stability problem. For example, upon identifying (by, e.g., analyzing health logs 122) an unexpected stability problem with device 202(1), identification module 104 may mine event logs 124 for evidence of an event (or events) that occurred on device 202(1) at or near the same time as the occurrence of the stability problem in question.

FIG. 4 is an exemplary illustration of the type of information that identification module 104 may analyze when attempting to identify events that are potentially responsible for stability problems. As detailed above, in this example a computing device and/or software component may have experienced an unexpected stability problem at time 415 due to falling below stability standard 420. Upon identifying (by, e.g., analyzing health logs 122) this stability problem, identification module 104 may then identify (by, e.g., analyzing event logs 124) the occurrence of an event (such as the creation or modification of a shared library file) at time 410 that immediately preceded time 415. In this example, identification module 104 may determine that the event that occurred at time 410 is potentially responsible for the occurrence of the unexpected stability problem since the stability of the device or software component in question began to suffer immediately after occurrence of the event.

In addition to timing-based characteristics, the systems described herein may also consider various other characteristics when attempting to identify events that are potentially responsible for the occurrence of unexpected stability problems. For example, identification module 104 may also consider whether the event in question involved or targeted the particular software component that is experiencing the unexpected stability problem, as opposed to another, unrelated software component. For example, if identification module 104 determines that the program "calc.exe" on device 202(1) is experiencing unexpected stability problems, identification module 104 may mine event logs 124 associated with device 202(1) for events that both (1) occurred substantially contemporaneously with respect to the start of the stability problem in question and (2) involved or targeted the program "calc.exe" (e.g., events that involved injecting code into, and/or creating or modifying a shared library relied on by, the program "calc.exe".). Similarly, if identification module 104 determines that an operating system installed on device 202(1) is experiencing unexpected stability problems, identification module 104 may mine event logs 124 associated with device 202(1) for events that both (1) occurred substantially contemporaneously with respect to the start of the stability problem in question and (2) involved or targeted the operating system in question (e.g., events that involved creating or modifying registry entries associated with the operating system's services and/or modifying the operating system's kernel).

Returning to FIG. 3, at step 306 the systems described herein may determine, due at least in part to the event being potentially responsible for the occurrence of the unexpected stability problem on the previously stable computing device, that the event is potentially malicious. For example, determination module 106 may, as part of server-side computing device 206 in FIG. 2, determine that the event identified in step 304 is potentially malicious due at least in part to the event being potentially responsible for the occurrence of the unexpected stability problem identified in step 302.

The systems described herein may perform step 306 in a variety of ways. In one example, the determination that the event is potentially malicious (and thus requires further scrutiny) may be based solely on the determination in step 304 that the event is potentially responsible for the occurrence of the unexpected stability problem. For example, because developers of malicious software often lack the expertise, time, and/or ability to adequately test the impact of malicious software on the wide range of hardware and software configurations that exist in the wild, the occurrence of an unexpected stability problem on a previously stable computing device may, in and of itself, represent a potentially suspicious event that deserves further scrutiny.

In other examples, however, the determination that the event is potentially malicious may be additionally based on a variety of other factors or considerations. In particular, in one example this determination may be based at least in part on whether the event in question is potentially indicative of infection by a non-process threat.

The term "non-process threat," as used herein, generally refers to any type or form of malicious code that attempts to manipulate, modify, or otherwise utilize an otherwise legitimate process to accomplish a malicious purpose. For example, a malware developer may register a malicious DLL (by, for example, tricking a user into running a malicious executable file or by exploiting a buffer overflow in a legitimate application) for loading by a trusted application, such as MICROSOFT WORD for WINDOWS. In this example, when MICROSOFT WORD loads, the malicious DLL will also load and launch, potentially scheduling background threats that launch attacks directly from the process space associated with MICROSOFT WORD.

Unfortunately, because non-process threats often run under the cover of an otherwise legitimate process, conventional security software often struggle to identify and/or combat the same. The systems and methods described herein may, however, be particularly suited to identifying non-process threats since these threats often attempt to modify or change the functionality or operation of previously stable, legitimate processes, which may in turn dramatically impact the stability of these legitimate processes. As such, in some embodiments, the maliciousness determination in step 306 may be based at least in part on whether the event in question is potentially indicative of infection by a non-process threat.

Determination module 106 may analyze a variety of event characteristics when determining whether the event is indicative of infection by a non-process threat. Examples of such characteristics include, without limitation, whether the event involved code injection, creating or modifying a shared library (such as modifying a shared DLL within Appinit_DLLs in WINDOWS), creating or modifying registry entries (such as registry entries that control system services), installing or modifying a kernel component (such as a kernel driver), and/or any other act that may result in the modification of a process' functionality and/or that may be indicative of potential infection by a non-process threat.

Additionally or alternatively, the determination in step 306 that the event is potentially malicious may be additionally based at least in part on whether other computing devices have also experienced the unexpected stability problem in question. For example, if determination module 106 determines, by analyzing event logs 124, that only devices within a particular community (e.g., an enterprise or industry, such as a pharmaceutical company or a group of government defense contractors) have experienced the unexpected stability problem and/or event in question, determination module 106 may determine that the event in question is potentially part of an Advanced Persistent Threat (APT) targeted at a particular enterprise or industry.

In contrast, if determination module 106 determines, by analyzing event logs 124, that a large majority of all WINDOWS users have also experienced the unexpected stability problem and/or event in question, determination module 106 may determine that the event in question likely represents a non-malicious event, such as a botched (but legitimate) patch deployment.

Returning to FIG. 3, at step 308 the systems described herein may perform a security action in response to determining that the event is potentially malicious. For example, security module 108 may, as part of server-side computing device 206 in FIG. 2, perform a security action in response to the determination in step 306 that the event identified in step 304 is potentially malicious.

The phrase "security action," as used herein, generally refers to any effort to report, analyze, prevent, and/or otherwise remediate a potentially malicious act. Examples of the types of security actions that security module 108 may perform in step 308 include, without limitation, analyzing the event (by, e.g., determining whether other characteristics or behaviors of the event match or trigger other security signatures or heuristics), transmitting a notification to at least one additional computing device that indicates that the event is potentially malicious, blacklisting the event, removing, blocking, or quarantining processes, files, or objects associated with the event, etc.

For example, security module 108 may add information identifying the event in question (such as a signature created based on various characteristics or behaviors associated with the event) to blacklist 126, which may in turn be deployed to an entire community (such as the user base of a security software publisher). Similarly, security module 108 may transmit a notification to an administrator of an enterprise (or to a community at large) that indicates that the event in question is potentially malicious. In this example, the notification may include a variety of information that may be useful in identifying and/or combating the event, such as a signature created based on various characteristics or behaviors associated with the event, the time that the event occurred or ended, the process, file, registry entry, or storage or memory location associated with or targeted by the event, information that identifies the origin of the event (e.g., the process or file name of an object that initiated the event), etc.

Upon completion of step 308, the process flow of exemplary method 300 in FIG. 3 may terminate.

As detailed above, by identifying and scrutinizing events that are responsible for unexpected stability problems on previously stable computing devices, the systems and methods described herein may be able to identify potential security issues (such as non-process threats and/or advanced persistent threats) that may otherwise remain undetected. In addition, by verifying whether other computing devices (such as computing devices within a particular enterprise, industry, or the world at large) have also experienced the stability problems and/or events in question, the disclosed systems and methods may be able to reduce false positives, potentially resulting in a more accurate and effective security solution.

Figure 5:
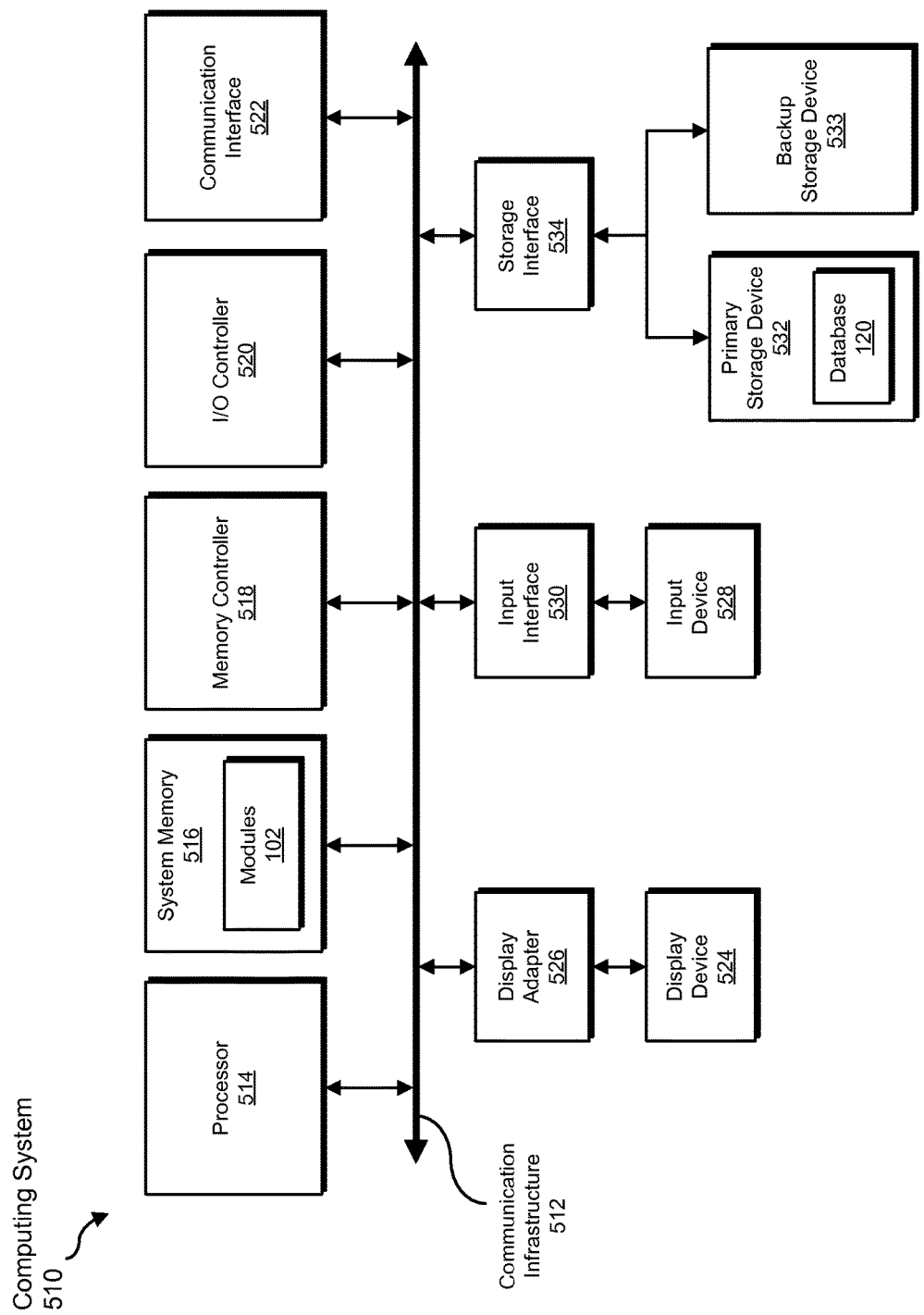
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and

533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
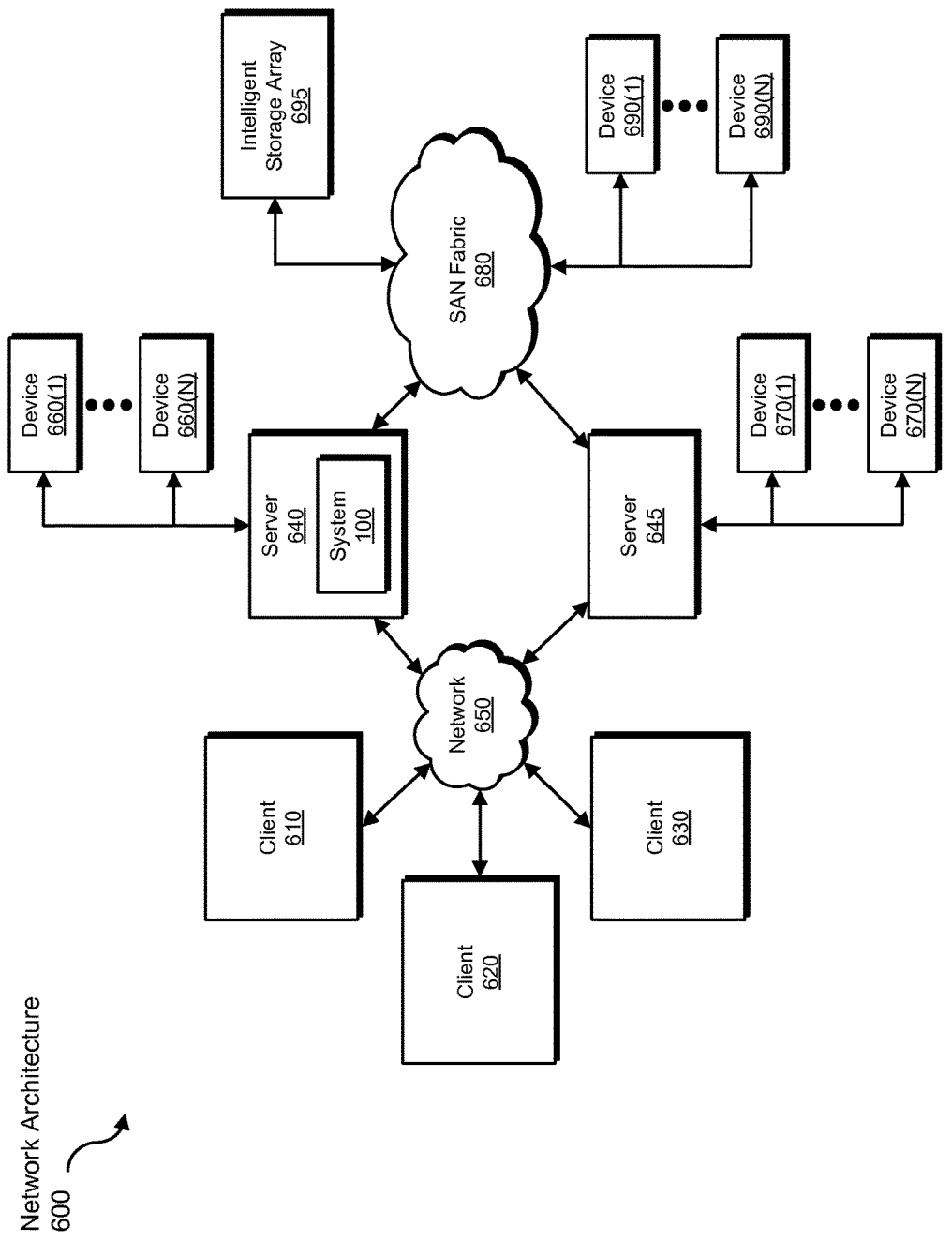
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting malware-induced crashes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive both health and event log data, transform this health and event log data into an identification of a potentially malicious event, output a result of this transformation (i.e., the identification of the potentially malicious event) to a security system, use the result of the transformation to report, remediate, and/or otherwise prevent future occurrences of the potentially malicious event, and store the result of the transformation in a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware-induced crashes, at least a portion of the method being performed by a computing device comprising at least one processor, the method comprising:
    identifying, by analyzing a health log associated with a previously stable computing device, an occurrence of an unexpected stability problem on the previously stable computing device, wherein the health log tracks at least one of:
        the overall stability of the previously stable computing device over time;
        the stability, over time, of application software installed on the previously stable computing device; and
        the stability, over time, of system software installed on the previously stable computing device;
    identifying, by analyzing an event log associated with the previously stable computing device, an event that is potentially responsible for the occurrence of the unexpected stability problem on the previously stable computing device;
    identifying a community of computing devices operating within at least one of a particular enterprise and a particular industry, the community of computing devices comprising the previously stable computing device;
    determining that the event is potentially malicious based at least on:
        the event being potentially responsible for the occurrence of the unexpected stability problem on the previously stable computing device;
        a determination that other computing devices within the community of computing devices have also experienced the unexpected stability problem;
        a determination that computing devices outside of the community of computing devices have not experienced the unexpected stability problem; and
        a determination that the event is potentially part of an advanced persistent threat targeted at the community of computing devices; and
    performing a security action in response to determining that the event is potentially malicious that improves at least one of the security, performance, and stability of at least one of the previously stable computing device and one or more additional computing devices.

2. The computer-implemented method of claim 1, wherein identifying the occurrence of the unexpected stability problem on the previously stable computing device comprises identifying, by analyzing the health log, at least one of:
    an unexpected stability problem with previously stable application software; and
    an unexpected stability problem with previously stable system software.

3. The computer-implemented method of claim 1, wherein the health log is created by security software installed on the previously stable computing device.

4. The computer-implemented method of claim 1, wherein identifying the occurrence of the unexpected stability problem on the previously stable computing device comprises identifying, by analyzing the health log, at least one of:
    a decrease in the overall stability of the previously stable computing device;
    a decrease in the stability of application software installed on the previously stable computing device; and
    a decrease in the stability of system software installed on the previously stable computing device.

5. The computer-implemented method of claim 1, further comprising, prior to analyzing the health log, at least one of:
    creating the health log; and
    retrieving the health log.

6. The computer-implemented method of claim 1, wherein identifying the event that is potentially responsible for the occurrence of the unexpected stability problem on the previously stable computing device comprises at least one of:
    determining, by analyzing the event log and the health log, that the event occurred contemporaneously with respect to the start of the unexpected stability problem; and determining that the event involved a software component, installed on the previously stable computing device, that experienced the unexpected stability problem.

7. The computer-implemented method of claim 1, wherein the determination that the event is potentially malicious is further based at least in part on a determination that the event is potentially indicative of infection by a non-process threat.

8. The computer-implemented method of claim 7, wherein the determination that the event is potentially indicative of infection by a non-process threat comprises determining that the event involves at least one of:
 code injection;
 creating or modifying a shared library;
 creating or modifying registry entries; and
 installing or modifying a kernel component.

9. The computer-implemented method of claim 1, wherein performing the security action comprises quarantining at least one of:
 a file associated with the event;
 an object associated with the event; and
 a process associated with the event.

10. The computer-implemented method of claim 1, wherein performing the security action comprises at least one of:
 transmitting a notification to at least one additional computing device that indicates that the event is potentially malicious; and
 blacklisting the event.

11. The computer-implemented method of claim 1, wherein the computing device that performs the method comprises at least one of:
 the previously stable computing device; and
 a server-side computing device.

12. A system for detecting malware-induced crashes, the system comprising:
 an identification module, stored in memory, that:
  identifies, by analyzing a health log associated with a previously stable computing device, an occurrence of an unexpected stability problem on the previously stable computing device, wherein the health log tracks at least one of:
   the overall stability of the previously stable computing device over time;
   the stability, over time, of application software installed on the previously stable computing device; and
   the stability, over time, of system software installed on the previously stable computing device;
  identifies, by analyzing an event log associated with the previously stable computing device, an event that is potentially responsible for the occurrence of the unexpected stability problem on the previously stable computing device; and
  identifies a community of computing devices operating within at least one of a particular enterprise and a particular industry, the community of computing devices comprising the previously stable computing device;
 a determination module, stored in memory, that determines that the event is potentially malicious based at least on:
  the event being potentially responsible for the occurrence of the unexpected stability problem on the previously stable computing device;
  a determination that other computing devices within the community of computing devices have also experienced the unexpected stability problem;
  a determination that computing devices outside of the community of computing devices have not experienced the unexpected stability problem; and
  a determination that the event is potentially part of an advanced persistent threat targeted at the community of computing devices; and;
 a security module, stored in memory, that performs a security action in response to determining that the event is potentially malicious that improves at least one of the security, performance, and stability of at least one of the previously stable computing device and one or more additional computing devices; and
 at least one physical processor that executes the identification module, the determination module, and the security module.

13. The system of claim 12, wherein the identification module identifies the occurrence of the unexpected stability problem on the previously stable computing device by identifying, by analyzing the health log, at least one of:
 an unexpected stability problem with previously stable application software; and
 an unexpected stability problem with previously stable system software.

14. The system of claim 12, wherein the identification module identifies the occurrence of the unexpected stability problem on the previously stable computing device by identifying, by analyzing the health log, at least one of:
 a decrease in the overall stability of the previously stable computing device;
 a decrease in the stability of application software installed on the previously stable computing device; and
 a decrease in the stability of system software installed on the previously stable computing device.

15. The system of claim 12, wherein the identification module identifies the event that is potentially responsible for the occurrence of the unexpected stability problem on the previously stable computing device by at least one of:
 determining, by analyzing the event log and the health log, that the event occurred contemporaneously with respect to the start of the unexpected stability problem; and
 determining that the event involved a software component, installed on the previously stable computing device, that experienced the unexpected stability problem.

16. The system of claim 12, wherein the determination that the event is potentially malicious is further based at least in part on a determination that the event is potentially indicative of infection by a non-process threat.

17. The system of claim 16, wherein the determination module determines that the event is potentially indicative of infection by a non-process threat by determining that the event involves at least one of:
 code injection;
 creating or modifying a shared library;
 creating or modifying registry entries; and
 installing or modifying a kernel component.

18. The system of claim 12, wherein the security module performs the security action by quarantining at least one of:
 a file associated with the event;
 an object associated with the event; and
 a process associated with the event.

19. The system of claim 12, wherein the security module performs the security action by at least one of:

transmitting a notification to at least one additional computing device that indicates that the event is potentially malicious; and blacklisting the event.

20. A non-transitory computer-readable medium comprising one or more computer-executable instructions that, when executed by at least one processor of a computing device, cause the computing device to:

identify, by analyzing a health log associated with a previously stable computing device, an occurrence of an unexpected stability problem on the previously stable computing device, wherein the health log tracks at least one of:

the overall stability of the previously stable computing device over time;

the stability, over time, of application software installed on the previously stable computing device; and the stability, over time, of system software installed on the previously stable computing device;

identify, by analyzing an event log associated with the previously stable computing device, an event that is potentially responsible for the occurrence of the unexpected stability problem on the previously stable computing device;

identify a community of computing devices operating within at least one of a particular enterprise and a particular industry, the community of computing devices comprising the previously stable computing device;

determine that the event is potentially malicious based at least on:

the event being potentially responsible for the occurrence of the unexpected stability problem on the previously stable computing device;

a determination that other computing devices within the community of computing devices have also experienced the unexpected stability problem;

a determination that computing devices outside of the community of computing devices have not experienced the unexpected stability problem; and a determination that the event is potentially part of an advanced persistent threat targeted at the community of computing devices; and perform a security action in response to determining that the event is potentially malicious that improves at least one of the security, performance, and stability of at least one of the previously stable computing device and one or more additional computing devices.

* * * * *